May 9, 1944.  G. PASTOR  2,348,410
APPARATUS FOR TAKING STEREOSCOPIC OR
THREE-DIMENSIONAL MOVING PICTURES
Filed Oct. 13, 1941
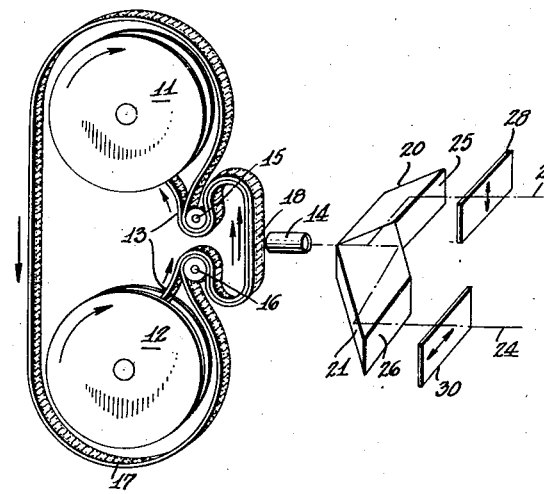
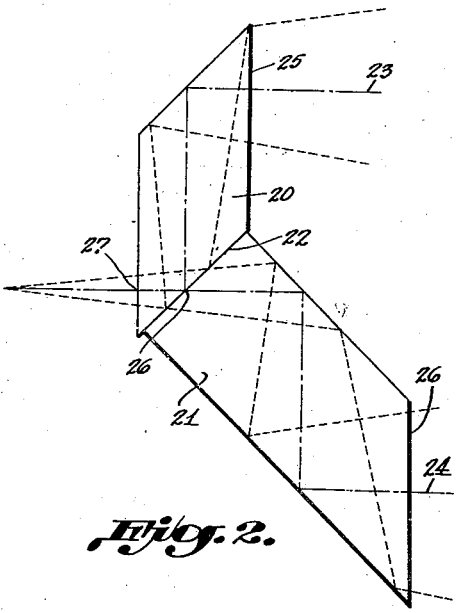
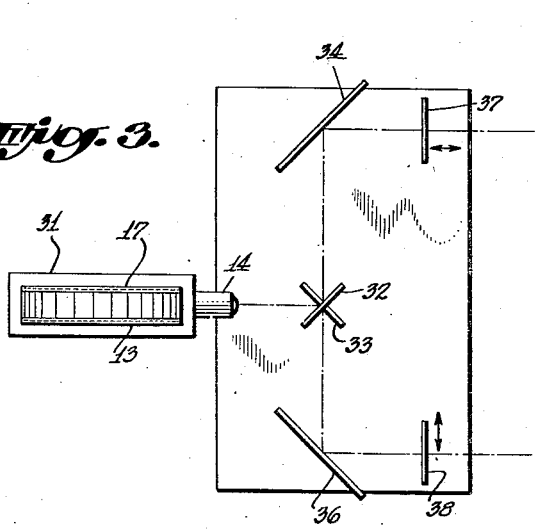
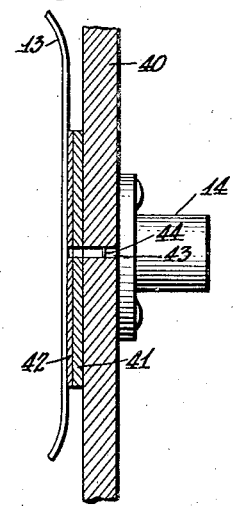
Inventor
GUILLERMO PASTOR
By Blair + Kilcoyne
Attorneys Patented May 9, 1944

2,348,410

UNITED STATES PATENT OFFICE 2,348,410

APPARATUS FOR TAKING STEREOSCOPIC OR THREE-DIMENSIONAL MOVING PICTURES

Guillermo Pastor, La Paz, Bolivia

Application October 13, 1941, Serial No. 414,876

6 Claims. (Cl. 88—16.6)

This invention relates to an apparatus for taking stereoscopic or three-dimensional moving pictures.

To those familiar with the subject, it has long been desired to provide a simple and practical mechanism which will enable one to take pictures on a standard film, which film can be projected to produce a three-dimensional effect. Up to the present time such mechanisms adopted have been very expensive and not adaptable to moving picture cameras without extensive modification.

The present invention, having a very simple and compact construction, is particularly adaptable to cameras now in use without material modification.

One of the objects of the present invention is to provide a simple and practical attachment which may be directly associated with any ordinary moving picture camera of standard construction so as to take alternately right and left pictures on a standard film.

A further object of the invention is to provide relatively inexpensive attachments for cameras which may be inexpensively manufactured and applied without materially changing the structure and operation of the camera thereof.

Other objects will be in part obvious from the annexed drawings and in part hereinafter indicated in connection therewith by the following analysis of this invention.

This invention accordingly consists in the features of construction, combination of parts, and in the unique relation of the members and in the relative proportioning and disposition thereof, all as more completely outlined herein.

To enable others skilled in the art fully to comprehend the underlying features of this invention, that they may embody the same by the numerous modifications in structure and relation contemplated by the invention, a drawing depicting preferred forms of the invention has been annexed as part of this disclosure and in such drawing like characters of reference denote corresponding parts throughout the views, in which—

Fig. 1 is a semi-diagrammatic perspective view of the entire mechanism;

Fig. 2 is a plan view of the prisms shown in Fig. 1;

Fig. 3 is a plan view of a modification of the light directing apparatus shown in Fig. 1; and Fig. 4 is a cross-sectional view of the focus correcting plates and film markers.

Referring now to the drawing in detail, there is shown diagrammatically in Fig. 1 a camera having the usual reels 11 and 12 to carry a master film 13 past a lens 14, the usual cogs 15 and 16 supplying motivating force. In common practice today the reels 11 and 12 carrying the master film 13 are often contained within a separate magazine which is conveniently slid into position when the camera is to be placed in operation. For simplicity here, however, the position and structures of the reels, film, and cogs are shown diagrammatically in Fig. 1. Also carried past the lens 14 by the cogs 15 and 16 is an endless film or loop. This loop (hereafter referred to as a pilot film) passes between the master film 13 and the lens 14, running adjacent and flat beside the master film at a point 18 where the images enter the camera and expose the master film 13.

Pilot film 17 comprises frames treated with polarizing material in alternate senses as is described more fully in my copending application Serial No. 413,350, filed October 2, 1941. Therefore, any light entering the camera through lens 14 must pass through the pilot film 17 and then to master film 13.

At opposite sides in front of the lens 14 are placed reflecting means such as prisms 20, 21 whose receiving surfaces face toward the object to be photographed. These prisms, shown more in detail in Fig. 2, are so shaped and connected to each other that they reflect light to the lens 14. The connection between the prisms 20, 21 comprises a compound known in the art as Canada balsam. This Canada balsam is a flaked form of reflecting metal, such as steel, nickel or vaporized mercury, so that this connecting surface is semi-transparent as well as semi-reflecting. The optical axes 23, 24, shown more clearly in Fig. 2, enter prisms 20, 21, respectively, through surfaces 25 and 26. Optical axis 23 refracts angularly through the prism 20 to a point 26 along the connecting surface 22 where it intersects optical axis 24 similarly refracted through prism 21 and thence out of prism 20 at 27 to the optical axis of lens 14. It will thus be seen that optical axis 23 reflects from the flaked compound connecting the prisms 20, 21 at 26 through point 27 on its surface facing the camera to lens 14 while optical axis 24 reflects through prism 21 and through the connecting compound also emerging from prism 20 at 27.

A suitable distance directly in front of prism surfaces 25 and 26 are placed two polarizing filters in opposite senses as indicated by the arrows in Fig. 1. Light passing along the optical axis 23 therefore passes through the polarizing filter 28 through surface 25 of prism 20 and into lens 14. Light passing along optical axis 24 passes through the polarizing filter 30 entering prism 21 through surface 26 and then to lens 14.

Describing the operation of the device, light passes along optical axis 23 through filter 28 which is treated to polarize in a vertical sense before passing through prism 20 and into the camera. This light polarized in a vertical sense will only pass through the pilot film 17 if the particular frame intercepting this light is also treated to polarize in a vertical sense. If the frame on the pilot film 17 is treated to polarize in a horizontal sense, no light passes through to expose the corresponding frame on the master film. At the same time, light passes along optical axis 24 through filter 30 which is treated to polarize in a horizontal sense before entering prism 21 into the camera. If the frame of the pilot film 17 before the lens is treated to polarize in a vertical sense, light along axis 24 polarized horizontally by filter 30 cannot pass through the pilot film to expose a frame while light is entering from the other prism.

Thus it will be seen, when the camera is in operation and both films are in proper motion, that images are alternately taken right and left on the master film as the pilot film will only permit passage of images from one prism at a time, the other being effectively blocked by the polarization in opposite senses of the filter and the operative frame on the pilot film.

A plan view of a modification of the light directing apparatus corresponding to the prism arrangement in Fig. 1 is shown in Fig. 3. A standard moving picture camera 31 carries a standard film 13 and a pilot film 17 in the identical manner as in Fig. 1; that is, the pilot film, comprising a loop and having frames alternately treated to polarize in opposite sense, is moved simultaneously with and in front of the master film which is to be exposed. Directly in the optical axis of the lens 14 are placed mirrors 32 and 33 at right angles to each other. Angularly disposed at opposite sides of the lens 14 are rigidly fixed reflecting mirrors 34 and 36 within the optical axes of mirrors 32 and 33 which reflect light from the object photographed to reflecting mirrors 32 and 33 and to the camera through lens 14.

Intercepting light from the subject being photographed to mirrors 34 and 36 are filters 37 and 38 each treated to polarize in opposite senses. These filters 37 and 38 treated to polarize in opposite senses as indicated by the arrows are so positioned that light reflecting on to mirror 34 is polarized in a vertical sense while light reflecting on to mirror 36 is polarized in a horizontal sense. Therefore, light entering the camera from mirror 34 is polarized in a vertical sense only while light from mirror 36 is polarized only on a horizontal plane.

Following through the entire operation of this modification to produce right and left images on a film suitable for three-dimensional projection, all light from angularly disposed mirror 34 is polarized in a vertical sense before being reflected to the pilot film by means of mirror 32 but cannot expose the frame of the master film before the lens unless the corresponding frame of the pilot film is treated to polarize in a like or vertical sense. For purposes of illustration, if light from mirror 34 is polarized vertically and the pilot film frame before the master film frame is simultaneously in a vertical polarizing sense, it follows that light from mirror 36 polarized horizontally by filter 38 cannot be reflected past the pilot film because the light is effectively blocked when the polarizing material on the pilot film and the filter are in opposite senses. When the pilot film and master film proceed to the next frame, the reverse of the above procedure is true in that light from mirror 36 is permitted to expose the frame on the master film because the frame on the pilot film is then treated to polarize in a horizontal sense letting the light through from this side while light from mirror 34 is blocked.

Focus correcting plates and a film marker are shown in Fig. 4. When the pilot film 17 is placed in a standard camera between the master film and the lens, the focal length is increased the thickness of the pilot film and focus is not correct. Within usual cameras flat against the casing between the lens and the master film is a small rectangular plate having a nickel or chromium surface over which the master film slides when the camera is in use. The present invention divides this usual plate into two plates, 41 fixed to the casing in the usual manner and 42 removably clamped over plate 41. Plates 41 and 42 together are as thick as the usual plate but 42 is only the thickness of the pilot film. When the pilot film is in use, plate 42 is removed, but when the pilot film is not in use, as shown in Fig. 4, plate 42 is clamped over plate 41, substituting for the thickness of the removed pilot film, thereby always keeping the master film 13 even distance from the lens and retaining an unchanged focal length. By this improvement the focus is kept correct whether the pilot film is in use or not.

Referring now to the film marker, it is usual to have a pin hole 43 through the casing of cameras and plates as is shown in Fig. 4. This pin hole is beside the lens and lets light to the film track for the purpose of making suitable marks on the center of each frame track. When making three-dimensional pictures it is desirable to have a way of telling which frame is a right picture and which is a left. The present invention covers the pin hole passage with a piece of material 44 treated to polarize in a horizontal sense. Therefore, when the pilot film 17 was in use, having frames treated to polarize alternately in a horizontal and then a vertical sense, light would only pass through the pin hole 43 to the track of the master film when the frame on the pilot film before the pin hole was treated in a horizontal or like sense. When the pilot film frame before the pin hole was treated to polarize in a vertical sense, the material in the pin hole being treated to polarize in a horizontal sense, no light would come through the pin hole to mark the track on the master film by exposure. Therefore, alternate films are marked by this device, in a simple and inexpensive manner, and in a way that will permit the observer to tell instantly from any frame whether it is a right or left film.

Two methods of dividing the light before entering the camera are shown above, one utilizing two prisms, the other a series of reflecting mirrors. Each of these types of light directing apparatus utilize polarizing filters intercepting optical axes at either side of the receiving lens so that first one side and then the other may be effectively blocked out when used in conjunction with an alternately polarized pilot film, thereby producing a right and left film suitable for three-dimensional projection. It may be here noted that in Fig. 3 mirrors 32 and 34 may be replaced by any suitable means such as angularly disposed mirrors or mirrors combined with a semi-transparent mirror to effectively reflect light into the camera, but, by showing this preferred form, it is in no way intended to limit the scope of the invention.

Polarizing filters 37 and 38 are shown in Fig. 3 intercepting the optical axes on either side of the camera before they reflect on mirrors 34 and 36, respectively, and then into the camera. These polarizing filters might easily be placed intercepting the optical axes between mirrors 34 and 32, and 36 and 33. They might also be placed directly on the surfaces of the mirrors 34 and 36, respectively, obviously in opposite senses. This would produce the same effect perhaps in a less complicated and bulky manner. Thus the form shown in Fig. 3 might be modified in many ways by changing the positions of polarizing filters 37 and 38.

Without further analysis, the foregoing will so fully reveal the gist of this invention that others can, by applying current knowledge, readily adapt it for various applications without omitting certain features that, from the standpoint of the prior art, fairly constitute essential characteristics of the generic or specific aspects of the invention, and therefore such adaptations should and are intended to be comprehended within the meaning and range of equivalency of the following claims.

I claim:

1. In an apparatus for taking stereoscopic moving pictures, in combination, a moving picture camera having a master film, a pilot film movable in front of and adjacent to the master film past the lens of the camera, said pilot film having its alternate frames treated to polarize light in opposite senses, and angularly disposed mirrors at either side of the lens reflecting to mirrors placed immediately within the optical axis of the lens, the light between the angularly disposed mirrors and the mirrors directly within the optical axis of the lens being intercepted by polarizing filters in opposite senses to alternately block light passing to the film.

2. In an apparatus for taking stereoscopic moving pictures, in combination, a moving picture camera having a master film, a pilot film movable in front of and adjacent to the master film past the lens of the camera, said pilot film having its alternate frames treated to polarize light in opposite senses, and angularly disposed mirrors at either side of the lens to reflect light to the camera whose surfaces are treated to polarize in opposite senses to alternately block light passing to the film.

3. In an apparatus for taking stereoscopic moving pictures, in combination, a moving picture camera having a master film, a pilot film movable in front of and adjacent the master film and past the lens of the camera, said pilot film having its alternate frames treated to polarize light in opposite senses, a divided slide plate between the lens and pilot film with the half adjacent the pilot film the thickness of the pilot film removable when the pilot film is in use to keep the master film in focus and a certain distance from the lens.

4. In an apparatus for taking stereoscopic motion pictures, in combination, a moving picture camera having a master film, a pilot film moving in front of and adjacent the master film and past the line of the camera, said pilot film having its alternate frames treated to polarize light in opposite senses, and being positioned entirely within the camera and behind the camera lens, means whereby light from points at either side of the lens is intercepted by polarizing filters in opposite senses before being reflected to the camera lens to alternately block light passing to the film, and means for reflecting light from said points at either side of the lens to the camera, said last mentioned means comprising angularly disposed mirrors at either side of the lens reflecting to mirrors placed immediately within the optical axis of the lens.

5. In an apparatus for taking stereoscopic motion pictures, in combination, a moving picture camera having a master film, a pilot film moving in front of and adjacent the master film and past the line of the camera, said pilot film having its alternate frames treated to polarize light in opposite senses and being positioned entirely within the camera and behind the camera lens, means whereby light from points at either side of the lens is intercepted by polarizing filters in opposite senses before being reflected to the camera lens to alternately block light passing to the film, and means for reflecting light from said points at either side of the lens to the camera, said last mentioned means comprising prisms placed within the optical axis of the lens.

6. In a stereoscopic moving picture apparatus, in combination, a single lens system, a master film, a pilot film movable in front of and adjacent the master film and past the lens of the apparatus, said pilot film having its alternate frames treated to polarize light in opposite senses, the moving picture apparatus having a pin hole beside the lens to mark the track of the master film, said pin hole being blocked with a material treated to polarize light in a sense equal to one sense of the pilot film and opposite the other sense of the pilot film to expose a point on the track on alternate prisms of the master film.

GUILLERMO PASTOR.